United States Patent [19]

Tang et al.

[11] Patent Number: 5,876,623
[45] Date of Patent: Mar. 2, 1999

[54] BIODEGRADABLE ASPARTIC ACID POLYMERS FOR PREVENTING SCALE FORMATION IN BOILERS

[75] Inventors: Jiansheng Tang, Naperville; Donald E. Govoni, Joliet, both of Ill.

[73] Assignee: Nalco Chemical Company, Naperville, Ill.

[21] Appl. No.: 717,374

[22] Filed: Sep. 20, 1996

[51] Int. Cl.$^6$ .................................................. C02F 5/12
[52] U.S. Cl. ........................ 252/180; 252/353; 252/354; 252/355; 252/356; 252/357; 252/175; 510/247; 510/264; 510/266; 210/698; 525/328.4; 525/420; 525/328.2; 528/322; 528/328; 528/332
[58] Field of Search .................................. 510/247, 264, 510/266; 252/180, 175, 353, 354, 355, 356, 357; 210/698; 525/328.4, 420, 328.2; 528/322, 328, 332

[56] References Cited

U.S. PATENT DOCUMENTS

| | | | |
|---|---|---|---|
| 3,590,122 | 6/1971 | Hutcheson et al. | 510/119 |
| 4,363,797 | 12/1982 | Jacquet et al. | 528/322 |
| 5,306,429 | 4/1994 | Wood et al. | 210/698 |
| 5,350,536 | 9/1994 | Chen et al. | 510/247 |

FOREIGN PATENT DOCUMENTS 2139087  11/1984  United Kingdom .

OTHER PUBLICATIONS

Chemical Abstracts Number 116:54036, Feb. 1992.

*Primary Examiner*—Alan Diamond
*Attorney, Agent, or Firm*—Hill & Simpson

[57] ABSTRACT

A biodegradable anti-scalant for steam generators, boilers and other heat transfer equipment is provided. Anti-scalants prepared in accordance with the present invention include aspartic acid, poly(aspartic acid) and copolymers of aspartic acid and functionalized aspartic acid. Anti-scalants provided in accordance with the present invention are biodegradable and therefore more environmentally friendly than currently available anti-scalant for use with hard water. Methods and use of making anti-scalants are also provided.

16 Claims, 1 Drawing Sheet

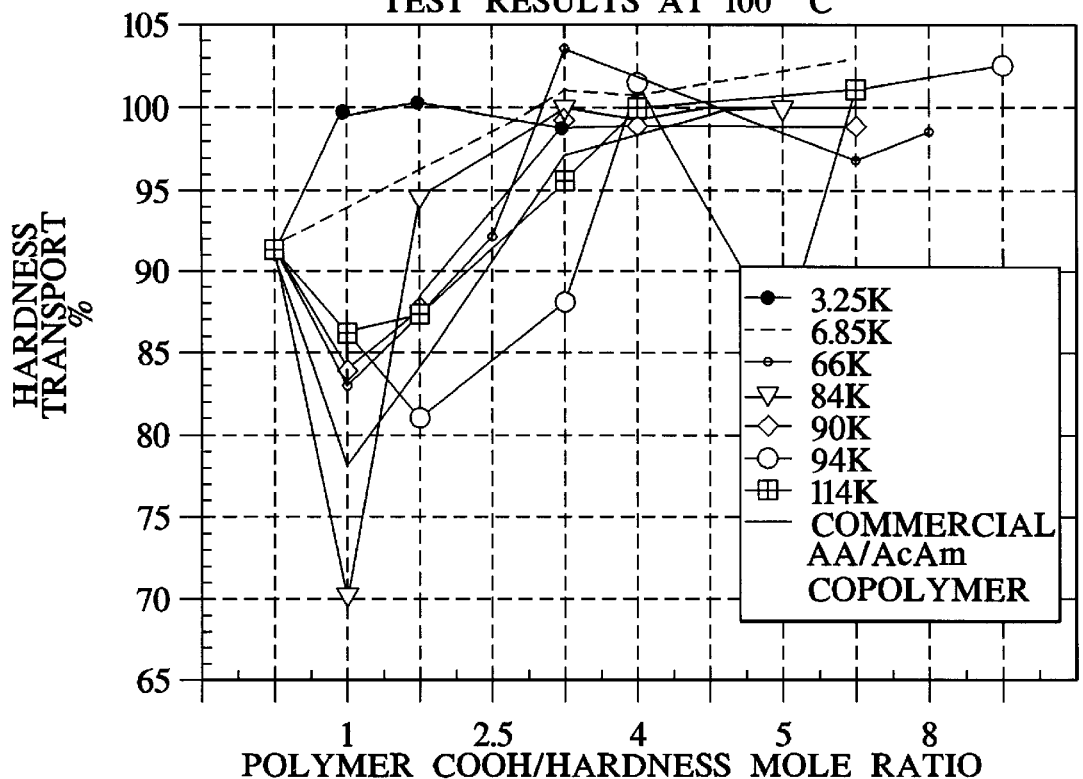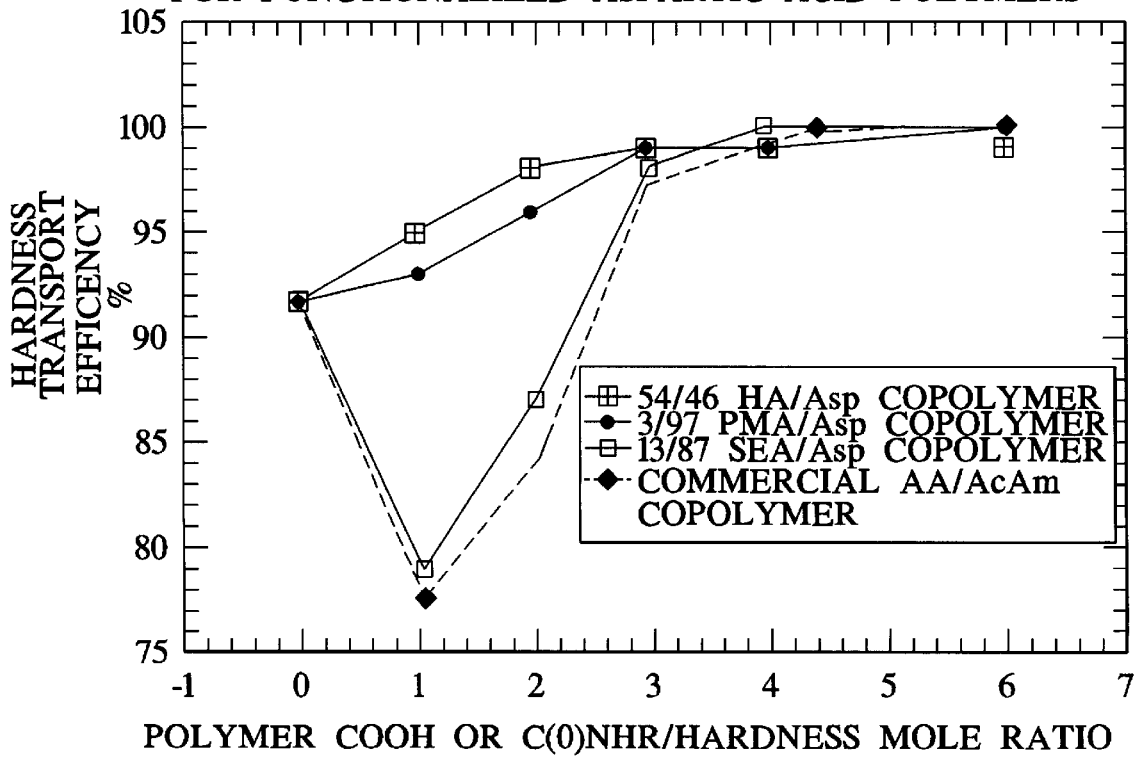

BIODEGRADABLE ASPARTIC ACID POLYMERS FOR PREVENTING SCALE FORMATION IN BOILERS

BACKGROUND OF THE INVENTION

The present invention relates generally to industrial boilers and steam generators and more specifically to the prevention of calcium, magnesium and silicate scale build-up on the inside surfaces of the boilers and steam generators.

In the design and operation of steam generators, it is essential that the boiler be designed efficiently and operated efficiently as well. However, during operation, scale build-up on the inside surfaces of a boiler can be very problematic. The presence of scaling inside the boiler significantly interferes with the heat transfer from the inside surface of the boiler to the water or steam. By interfering with the heat transfer process, the scaling significantly reduces the efficiency of the boiler. Even more important than heat loss is that scaling causes overheating of the boiler metal and can result in subsequent tube failures. Costly repairs and boiler outages are the results of such a condition.

Also, scaling on the surface of metal leads to corrosion underneath the scaling. Thus, scaling contributes to corrosion of systems which prematurely weakens the structure and leads to leaks and ruptures in the boiler system. Therefore, scale prevention directly contributes to corrosion prevention as well.

In boilers used in steam generators, it has been found that the primary components of scale build-up are calcium derivatives, magnesium derivatives, silicates and iron derivatives in the feedwater. Deposits formed on the inside surfaces of the boiler can be removed by shutting the boiler down and cleaning the inside surfaces of the boiler, either chemically or mechanically. Obviously, any shut-down of a boiler is going to adversely effect the efficiency and overall economics of the operations.

Alternatively, treatment chemicals that inhibit or reduce scale buildup can be added directly to the boiler feedwater. Soda ash, sodium aluminate and phosphates have been such additives. These additives are non-corrosive to internal surfaces, but they can reduce heat transfer efficiency if they form insulating scales such as calcium phosphate scales. Chelating agents such as nitrilotriacetic acid and ethylenediamine tetra acetic acid offer superior cleanliness over phosphate programs. However, chelating agents have the potential for corrosion if they are overfed or fed to a system containing oxygen.

Synthetic organic polymers offer the cleanliness of chelates without the potential for boiler corrosion, even if overfed. They also offer greater hardness transport than conventional phosphate programs. However, until now, such synthetic organic polymers have been limited to non-biodegradable polymers. Increasing pressure on the water treatment industry has generated interest in the development of environmentally friendlier chemistries that offer biodegradability in addition to improved scale inhibition.

SUMMARY OF THE INVENTION

The present invention provides an improved, biodegradable anti-scalant for addition to feedwater which is converted to steam in industrial boilers, steam generators and other heat transfer equipment. The anti-scalant of the present invention includes poly(aspartic acid) of formula I and its functional derivatives of formula II as shown below.

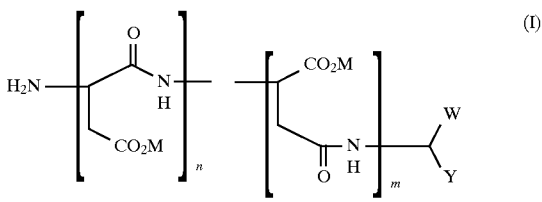

where $M^1$ may be H, an alkaline metal, an alkaline earth metal or ammonium; $n/(n+m) \times 100\%$ ranges from 0% to 100%, $m/(n+m) \times 100\%$ ranges from 0% to 100%, and the molecular weight ranges from 1,000 to 20,000. The polymers (i.e, polyaspartic acid) defined in formula I may be modified with one or more amines into a polymer of the general formula II:

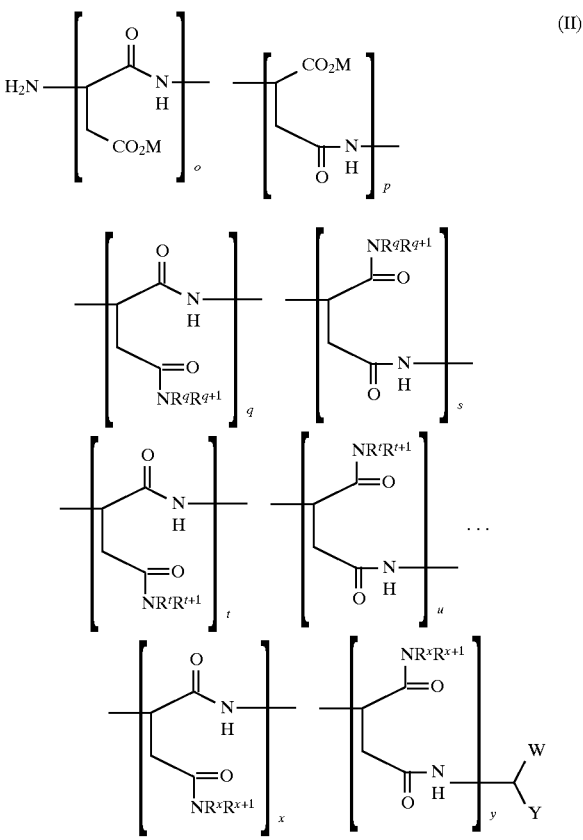

where $M^2$ may be H, an alkaline metal, an alkaline earth metal, ammonium or aluminum iron; $R^q$ through $R^x$ may be the same or different and are selected from the group consisting of H, $CH_3$ and $CH_2CH_3$; $R^{q+1}$ through $R^{x+1}$ may be the same or different and are selected from the group consisting of OH, $C_1$ to $C_{30}$ alkyl, $C_1$ to $C_{10}$ aryl, one or more hydroxy groups substituted alkyl, one or more hydroxy groups substituted aryl, one or more OR substituted alkyl groups, one or more OR substituted aryl groups where R is a $C_1$ to $C_4$ alkyl, one or more $SO_3M^3$ substituted alkyl groups, one or more $SO_3M^3$ substituted aryl groups wherein $M^3$ is H, an alkaline metal, an alkaline earth metal, ammonium, aluminum or iron, one or more $PO_3M_2^4$ substituted alkyl, and one or more $PO_3M_2^4$ substituted aryl where $M^4$ is H, an alkaline metal, an alkaline earth metal, ammonium, aluminum and iron; and $o/(o+p) \times 100\%$ ranges from 0% to 100%, $p/(o+p) \times 100\%$ ranges from 0% to 100%, o/(o+p)×100%+p/(o+p)×100% is 100%; q/(q+s)×100% ranges from 0% to 100%, s/(q+s)×100% ranges from 0% to 100%, q/(q+s)× 100%+s/(q+s)×100% is 100%; t/(t+u)×100% ranges from 0% to 100%, u/(t+u)×100% ranges from 0% to 100%, t/(t+u)×100%+u/(t+u)×100% is 100%; x/(x+y)×100% ranges from 0% to 100%, y/(x+y)×100% ranges from 0% to 100%, x/(x+y)×100%+y/(x+y)× 100% is 100%; (o+p)/(o+p+q+s+t+u+ . . . +x+y)× 100% ranges from 0.1% to 99.9%, preferably from 5% to 95%, more preferably from 20% to 80%; (q+s+t+u+ . . . +x+y)/(o+p+q+s+t+u+ . . . +x+y)× 100% ranges from 0.1% to 99.9%, preferably from 5% to 95%, more preferably from 20% to 80%; (o+p)/(o+p+q+s+t+u+ . . . +x+y)×100%+(q+s+t+u+ . . . +x+y)/(o+p+q+s+t+u+ . . . x+y)×100% is 100%; (q+s)/(q+s+t+u+ . . . +x+y)×100% ranges from 0% to 100%; (t+u)/(q+s+t+u+ . . . +x+y)×100% ranges from 0% to 100%; (x+y)/(q+s+t+u+ . . . +x+y)×100% ranges from 0% to 100%; (q+s)/(q+s+ t+u+ . . . +x+y)+(t+u)/(q+s+t+u+ . . . +x+y)+(x+y)/ (q+s+t+u+ . . . +x+y)×100% is 100%.

If (o+p)/(o+p+q+s+t+u+ . . . +x+y)×100% ≠ 0, and if only one of items (q+s)/(q+s+t+u+ . . . +x+y)×100%, (t+u)/(q+s+t+u+ . . . +x+y)×100%, . . . , (x+y)/(q+s+t+u+ . . . +x+y×100%)≠ 0, the polymer of the general formula II is a copolymer. In other words, if $R^q$, $R^t$, . . . , $R^x$ are the same, and if $R^{q+1}$, $R^{t+1}$, . . . , $R^{x+1}$ are the same, the polymer of the general formula II is a copolymer.

$R^{q+1}$, $R^{t+1}$, . . . , $R^{x+1}$ are selected from the group consisting of OH, $CH_3$, $CH_2CH_3$, $CH_2CH_2CH_3$, $CH_2CH_2CH_2CH_3$, $CH_2CH_2OH$, $CH_2CH_2CH_2OH$, $CH_2CH(OH)CH_3$, $CH(CH_2OH)$, $C(CH_2OH)_3$, $C(CH_2OH)_2CH_3$, $C(CH_2OH)_2CH_2CH_3$, $CH_2SO_3M^5$, $CH_2CH_2SO_3M^5$, $CH_2PO_3M^6{}_2$, $CH_2CH_2PO_3M_2{}^6$, $CH_2CH_2CH_2PO_3M_2{}^6$, wherein $M^5$ and $M^6$ are selected from the group consisting of H, an alkaline metal ion, an alkaline earth metal ion, $Al^{+3}$, $Fe^{+2}$ and $Fe^{+3}$; $CH_2CH_2OCH_3$, $CH_2CH_2OCH_2CH_3$, $CH_2CH_2O(CH_2H_2O)_n$—R wherein n ranges from 0 to 50, and R is selected from the group consisting of H, a $C_1$ to $C_4$ alkyl, $C_6H_5$, $CH_2(C_6H_5)$, $CH_2CH_2NR^1(CH_2CH_2NR^2)_nR^3$ wherein n=0 to 50, $R^1$ and $R^2$ are selected from the group consisting of H, $CH_3$ and $CH_2CH_3$, $R^3$ is selected from the group consisting of H, $CH_3$ and $CH_2CH_3$, $W=CO_2M^7$, $CO_2NR^1R^2$ and $Y=CH_2CO_2M^7$, $CH_2CONR^1R^2$ wherein $R^1$ is H, $CH_3$, $CH_2CH_3$, $R^2$ is $R^{q+1}$, $R^{t+1}$, . . . , $R^{x+1}$, $M^7$ is H, an alkaline metal ion, an alkaline earth metal ion, ammonium, $Al^{+3}$, $Fe^{+2}$ and $Fe^{+3}$.

It has further been found that lower molecular weight aspartic acid polymers provide improved hardness transport or scale reduction in boiler tests conducted at one atmosphere while higher molecular weight aspartic acid polymers provide improved hardness transport or scale reduction in boiler test at 100 psig.

In an embodiment, the anti-scalant of the present invention includes copolymers of N-hydroxyaspartamide/aspartic acid of ratios ranging from 0.1/99.9 to 99.9/0.1, preferred 5/95 to 70/30, more preferred 10/90 to 50/50.

In an embodiment, the anti-scalant of the present invention includes copolymers of N-phosphonomethylaspartamide/aspartic acid of ratios ranging from 0.1/99.9 to 99.9/0.1, preferred 5/95 to 90/10, more preferred 10/90 to 30/70.

In an embodiment, the anti-scalant of the present invention includes copolymers of N-2-sulfonoethylaspartamide/aspartic acid of ratios ranging from 0.1/99.9 to 99.9/0.1, preferred 5/95 to 70/30, more preferred 10/90 to 50/50.

In an embodiment, the anti-scalant of the present invention includes copolymers of N-methyl-N-hydroxyaspartamide/aspartic acid of ratios ranging from 0.1/99.9 to 99.9/0.1, preferred 5/95 to 70/30, more preferred 10/90 to 50/50.

In an embodiment, the anti-scalant of the present invention includes copolymers of N-phophonoethylaspartamide/aspartic acid of ratios ranging from 0.1/99.9 to 99.9/0.1, preferred 5/95 to 70/30, more preferred 10/90 to 50/50.

In an embodiment, the anti-scalant of the present invention includes copolymers of N-2-phosphonopropylaspartamide/aspartic acid of ratios ranging from 0.1/99.9 to 99.9/0.1, preferred 5/95 to 30/70, more preferred 10/90 to 50/50.

In an embodiment, the anti-scalant of the present invention includes copolymers of N-sulfonomethylaspartamide/aspartic acid of ratios ranging from 0.1/99.9 to 99.9/0.1, preferred 5/95 to 70/30, more preferred 10/90 to 50/50.

In an embodiment, the anti-scalant of the present invention includes copolymers of N-2-hydroxyethylaspartamide/aspartic acid of ratios of 0.1/99.9 to 99.9/0.1, preferred 5/95 to 70/30, more preferred 10/90 to 50/50.

In an embodiment, the anti-scalant of the present invention includes copolymers of N-2-hydroxypropylaspartamide/aspartic acid of ratios ranging from 0.1/99.9 to 99.9/0.1, preferred 5/95 to 30/70, more preferred 10/90 to 50/50.

In an embodiment, the anti-scalant of the present invention includes copolymers of N-2-(2-hydroxyethoxy) ethylaspartamide/aspartic acid of ratios ranging from 0.1/99.9 to 99.9/0.1, preferred 5/95 to 30/70, more preferred 10/90 to 50/50.

In an embodiment, the anti-scalant of the present invention includes copolymers of N-2-(2-hydroxyethylamino) ethylaspartamide/aspartic acid of ratios ranging from 0.1/99.9 to 99.9/0.1, preferred 5/95 to 70/30, more preferred 10/90 to 50/50.

In an embodiment, the anti-scalant of the present invention includes copolymers of N-methylaspartamide/aspartic acid of ratios ranging from 0.1/99.9 to 99.9/0.1, preferred 5/95 to 70/30, more preferred 10/90 to 50/50.

In an embodiment, the anti-scalant of the present invention includes copolymers of N-ethylaspartamide/aspartic acid of ratios ranging from 0.1/99.9 to 99.9/0.1, preferred 5/95 to 70/30, more preferred 10/90 to 50/50.

In an embodiment, the anti-scalant of the present invention includes copolymers of N-propylaspartamide/aspartic acid of ratios ranging from 0.1/99.9 to 99.9/0.1, preferred 5/95 to 70/30, more preferred 10/90 to 50/50.

An advantage of the present invention is that it provides biodegradable anti-scalant for use in industrial boilers, steam generators and heat transfer equipment.

Another advantage of the present invention is that it provides non-toxic anti-scalant for use in boilers, steam generators and other heat transfer equipment.

Yet another advantage of the present invention is that it provides an improved method of reducing scale build-up inside heat transfer equipment without interrupting the processes carried out by such equipment.

Another advantage of the present invention is that it provides a method of making improved anti-scalants.

Still another advantage of the present invention is that it provides an improved method for reducing scale build-up in heat transfer equipment that is caused by the use of hard water.

Additional features and advantages of the present invention are described in, and will be apparent from, the detailed description of the presently preferred embodiments and from the figures.

BRIEF DESCRIPTION OF THE FIGURES

FIG. 1 illustrates the rate of hardness transport versus anti-scalant dosage for eight (8) different anti-scalants, seven (7) of which are aspartic acid polymers prepared in accordance with the present invention and the eighth of which is an acrylamide/acrylic acid copolymer.

FIG. 2 illustrates the hardness transport versus dosage for three (3) functionalized aspartic acid polymers prepared in accordance with the present invention and an acrylamide/acrylic acid copolymer.

DETAILED DESCRIPTION OF THE PRESENTLY PREFERRED EMBODIMENTS

The present invention provides an improved, biodegradable anti-scalant for addition to feedwater which is converted to steam in industrial boilers, steam generators and other heat transfer equipment. The anti-scalant of the present invention includes poly(aspartic acid) of formula I and its functional derivatives of formula II as shown below.

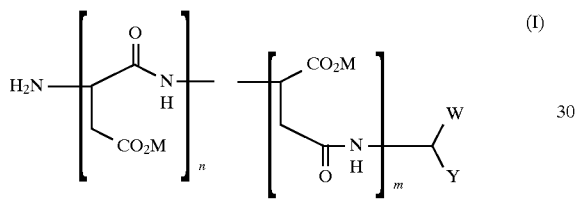

(I)

where $M^1$ may be H, an alkaline metal, an alkaline earth metal or ammonium; $n/(n+m) \times 100\%$ ranges from 0% to 100%, $m/(n+m) \times 100\%$ ranges from 0% to 100%, and the molecular weight ranges from 1,000 to 200,000. The polymers (i.e. polyaspartic acid) defined in formula I may be modified with one or more amines into a polymer of the general formula II:

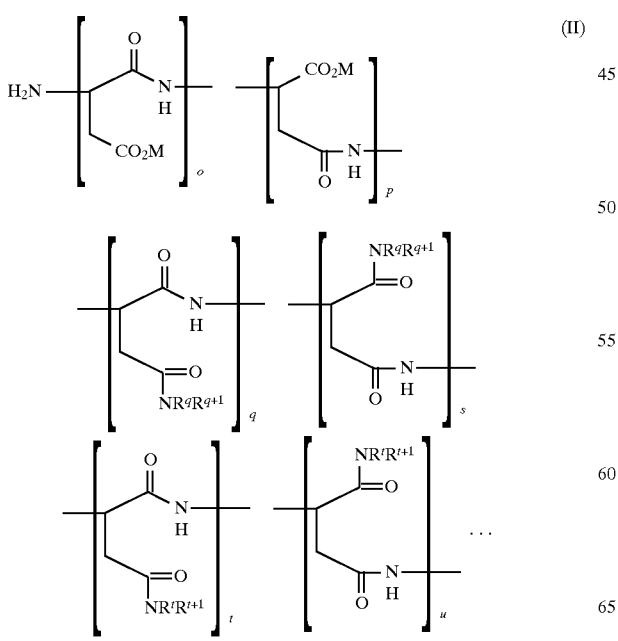

(II)

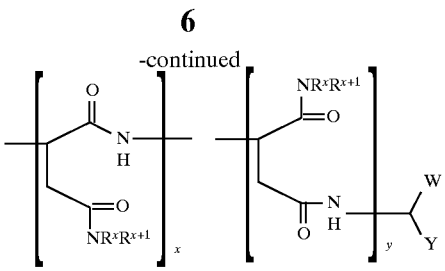

-continued where $M^2$ may be H, an alkaline metal, an alkaline earth metal, ammonium or aluminum iron; $R^q$ through $R^x$ may be the same or different and are selected from the group consisting of H, $CH_3$ and $CH_2CH_3$; $R^{q+1}$ through $R^{x+1}$ may be the same or different and are selected from the group consisting of OH, $C_1$ to $C_{30}$ alkyl, $C_1$ to $C_{10}$ aryl, one or more hydroxy groups substituted alkyl, one or more hydroxy groups substituted aryl, one or more OR substituted alkyl groups, one or more OR substituted aryl groups where R is a $C_1$ to $C_4$ alkyl, one or more $SO_3M^3$ substituted alkyl groups, one or more $SO_3M^3$ substituted aryl groups wherein $M^3$ is H, an alkaline metal, an alkaline earth metal, ammonium, aluminum or iron, one or more $PO_3M_2^4$ substituted alkyl, and one or more $PO_3M_2^4$ substituted aryl where $M^4$ is H, an alkaline metal, an alkaline earth metal, ammonium, aluminum and iron; and $o/(o+p) \times 100\%$ ranges from 0% to 100%, $p/(o+p) \times 100\%$ ranges from 0% to 100%, $o/(o+p) \times 100\% + p/(o+p) \times 100\%$ is 100%; $q/(q+s) \times 100\%$ ranges from 0% to 100%, $s/(q+s) \times 100\%$ ranges from 0% to 100%, $q/(q+s) \times 100\% + s/(q+s) \times 100\%$ is 100%; $t/(t+u) \times 100\%$ ranges from 0% to 100%, $u/(t+u) \times 100\%$ ranges from 0% to 100%, $t/(t+u) \times 100\% + u/(t+u) \times 100\%$ is 100%; $x/(x+y) \times 100\%$ ranges from 0% to 100%, $y/(x+y) \times 100\%$ ranges from 0% to 100%, $x/(x+y) \times 100\% + y/(x+y) \times 100\%$ is 100%; $(o+p)/(o+p+q+s+t+u+ \ldots +x+y) \times 100\%$ ranges from 0.1% to 99.9%, preferably from 5% to 95%, more preferably from 20% to 80%; $(q+s+t+u+ \ldots +x+y)/(o+p+q+s+t+u++x+y) \times 100\%$ ranges from 0.1% to 99.9%, preferably from 5% to 95%, more preferably from 20% to 80%; $(o+p)/(o+p+q+s+t+u+ \ldots +x+y) \times 100\% + (q+s+t+u+ \ldots +x+y)/(o+p+q+s+t+u+ \ldots +x+y) \times 100\%$ is 100%; $(q+s)/(q+s+t+u+ \ldots +x+y) \times 100\%$ ranges from 0% to 100%; $(t+u)/(q+s+t+u+ \ldots +x+y) \times 100\%$ ranges from 0% to 100%; $(x+y)/(q+s+t+u+ \ldots +x+y) \times 100\%$ ranges from 0% to 100%; $(q+s)/(q+s+t+u+ \ldots +x+y)+(t+u)/(q+s+t+u+ \ldots +x+y)+(x+y)/(q+s+t+u+ \ldots +x+y) \times 100\%$ is 100%.

If $(o+p)/(o+p+q+s+t+u+ \ldots +x+y) \times 100\% \neq 0$, and if only one of items $(q+s)/(q+s+t+u+ \ldots +x+y) \times 100\%$, $(t+u)/(q+s+t+u+ \ldots +x+y) \times 100\%$, $\ldots$, $(x+y)/(q+s+t+u+ \ldots +x+y \times 100\%) \neq 0$, the polymer of the general formula II is a copolymer. In other words, if $R^{q+}, R^{r+}, \ldots, R^{x+}$ are the same, and if $R^{q+1}, R^{r+1}, \ldots, R^{x+1}$ are the same, the polymer of the general formula II is a copolymer.

$R^{q+1}, R^{r+1}, \ldots, R^{x+1}$ are selected from the group consisting of OH, $CH_3$, $CH_2CH_3$, $CH_2CH_2CH_3$, $CH_2CH_2CH_2CH_3$, $CH_2CH_2OH$, $CH_2CH_2CH_2OH$, $CH_2CH(OH)CH_3$, $CH(CH_2OH)$, $C(CH_2OH)_3$, $C(CH_2OH)_2CH_3$, $C(CH_2OH)_2CH_2Ch_3$, $CH_2SO_3M^5$, $CH_2CH_2SO_3M^5$, $CH_2PO_3M_2^6$, $CH_2CH_2PO_3M_2^6$, $CH_2CH_2CH_2PO_3M_2^6$, wherein $M^5$ and $M^6$ are selected from the group consisting of H, an alkaline metal, an alkaline earth metal, ammonium, aluminum, iron; $CH_2CH_2OCH_3$, $CH_2CH_2OCH_2CH_3$, $CH_2CH_2O(CH_2H_2O)_n$—R wherein n ranges from 0 to 50, and R is selected from the group consisting of H, a $C_1$ to $C_4$ alkyl, $C_6H_5$, $CH_2(C_6H_5)$, $CH_2CH_2NR^1(CH_2CH_2NR^2)_nR^3$ wherein n=0 to 50, $R^1$ and $R^2$ are selected from the group consisting of H, $CH_3$ and $CH_2CH_3$, $R^3$ is selected from the group consisting of H, $CH_3$ and $CH_2CH_3$, $W=CO_2M^7$, $CO_2NR^1R^2$ and $Y=CH_2CO_2M^7$, $CH_2CONR^1R^2$ wherein $R^1$ is H, $CH_3$, $CH_2CH_3$, $R^2$ is $R^{q+1}, R^{t+1}, \ldots, R^{x+1}$, $M^7$ is H, an alkaline metal ion, an alkaline earth metal ion, $Al^{+3}$, $Fe^{+2}$ and $Fe^{+3}$.

It has further been found that lower molecular weight aspartic acid polymers provide improved hardness transport or scale reduction in boiler tests conducted at one atmosphere while higher molecular weight aspartic acid polymers provide improved hardness transport or scale reduction in boiler tests at 100 psig.

Several embodiments include aspartic acid polymers and functionalized aspartic acid polymers of varying molecular weight.

Of course, it will be appreciated that a wide variety of polymer formulations are possible in accordance with the present invention. By way of example, and not limitation, examples of suitable polymers and their effectiveness are presented below.

EXAMPLES

The effectiveness of the aspartic acid polymers depends upon the dosage ratio, or the polymer COOH/hardness mole ratio, as well as the molecular weight. Table 1 and FIG. 1 present the results of experiments utilizing poly(aspartic acid) polymers and aspartic acid monomer having polymer COOH/hardness mole ratios ranging from 1 to 10 for polymers of varying molecular weights.

get complete hardness transport. Because all of the poly (aspartic acid) samples are biodegradable, all of them, at the right dosage, provide an effective and environmentally friendly method for reducing or eliminating scale build-up in heat transfer equipment.

Three embodiments were tested. Those three embodiments are: N-hydroxyaspartamide/aspartic acid or HA-poly (asp), N-phosphonomethylaspartamide/aspartic acid (PMA/asp) copolymer (AMPA-poly(asp), and N-2-sulfonoethylaspartamide/aspartic acid (SEA/asp)copolymer or taurine-poly(asp). Hardness transport test results for these three functionalized aspartic acid polymers are provided in Table 2 below and pre illustrated in FIG. 2. A commercially available product (acrylamide/acrylic acid copolymer) is utilized for comparison purposes.

BENCHTOP HARDNESS TESTS

The benchtop hardness transport measurements were carried out using the following method. A solution of 50 ppm Ca (as $CaCO_3$) and 25 ppm Mg (as $CaCO_3$) was made from $CaCl_2$ and $MgCl_2$ salts, and then dosed with a given concentration of the polymer of interest and adjusted to pH of 11. The resulting solution was transferred to a Teflon reactor vessel containing a 900 watt cartridge heater and fitted with a reflux condenser. The solution was boiled for two hours at a heat flux of 110,000 BTU/ft$^2$-hr. The amount of hardness in the initial solution, in the final solution, and contained in the fire rod scale was analyzed by hardness titrations to determine the fraction of the initial hardness remaining in solution during the test and the fraction of hardness deposited on the fire rod. Measurements made using this benchtop method have been found to correlate well with scale boiler hardness transport measurements. The results are listed in Table 1 and Table 2.

TABLE 1

Benchtop Hardness Transport Test Results at 100° C.

| polymer COOH/ hardness mole ratio | hardness transport (%) of poly(asp) of different MWs | | | | | | | |
|---|---|---|---|---|---|---|---|---|
| | 3.25K | 6.85K | 66K | 84K | 90K | 94K | 114K | AA/AcAm[2] |
| 0[1] | 91.6 | 91.6 | 91.6 | 91.6 | 91.6 | 91.6 | 91.6 | 91.6 |
| 1 | 99.8 | 94 | 82.8 | 70 | 83.8 | — | 85.9 | 77.6 |
| 2 | 100.3 | 97 | — | 94 | 87.8 | 81 | 83.7 | 84.1 |
| 2.5 | — | — | 92.1 | — | — | — | — | — |
| 3 | 98.8 | 101 | 103.6 | 100 | 99.3 | 88 | 95.6 | 97.3 |
| 4 | 98.9 | 101 | 102 | 99 | 99 | 101.7 | 100.2 | — |
| 4.5 | — | — | — | — | — | — | 99.9 | — |
| 5 | — | — | — | 100 | — | 85.2 | — | 99.9 |
| 6 | 99 | 103 | 96.9 | — | 99.1 | 101.4 | 101.2 | — |
| 8 | — | — | 98.6 | — | — | — | — | — |
| 10 | — | — | — | — | — | 102.6 | — | — |

[1]Blank, i.e., no scale inhibitor.
[2]A commercial product of acrylic acid/acrylamide copolymer.

These results are also illustrated in FIG. 1. All of the poly(aspartic acid) samples as well as the aspartic acid monomer prevent scale formation to a certain extent on heat transfer surfaces when a sufficient dosage is used. The lower molecular weight poly(aspartic acid) samples show greater activity toward hardness transport in these tests. For example, the 3.25k sample showed 98% hardness transport even at a dosage of 1:1 polymer COOH/hardness mole ratio. The 6.85k, 66k, 84k and 90k all showed 100% hardness transport at a dosage ratio of 3:1 or higher. The 94k and 114k samples, as well as the commercial product (acrylamide/acrylic acid copolymer) required dosage of 4:1 in order to

TABLE 2

Benchtop Hardness Transport Test Results for Functionalized Aspartic Acid Polymers at 100° C.

| COOH plus C(O)NHR/hardness mole ratio | 54/46 HA/asp copolymer | 3/97 PMA/asp copolymer | 11/89 SEA/asp copolymer | AA/AcAm[2] copolymer |
|---|---|---|---|---|
| 0[1] | 91.6 | 91.6 | 91.6 | 91.6 |
| 1 | 95 | 93 | 79 | 77.6 |
| 2 | 98 | 96 | 87 | 84.1 |

TABLE 2-continued

Benchtop Hardness Transport Test Results for Functionalized Aspartic Acid Polymers at 100° C.

| COOH plus C(O)NHR/hardness mole ratio | 54/46 HA/asp copolymer | 3/97 PMA/asp copolymer | 11/89 SEA/asp copolymer | AA/AcAm[2] copolymer |
|---|---|---|---|---|
| 3 | 99 | 99 | 98 | 97.3 |
| 4 | 99 | 99 | 100 | — |
| 6 | 99 | 100 | 100 | — |

[1]Blank, no inhibitor was added.
[2]A commercial copolymer of acrylic acid/acrylamide.

SCALE BOILER TESTS

A small electric boiler commonly used to test anti-scalant programs (a scale boiler) was employed in this study. The boiler holds about 1200 ml of water and is fired by an electric resistance heating rod, or fire rod. The preboiler and sampling components are made of stainless steel and have been shown to produce an insignificant concentration of corrosion products in the system. Thus the only sources of iron corrosion products are the mild steel surfaces of the fire rod and the internal surface of the boiler. The boiler was run at loo psig. The steaming rate was set at 54 ml/minute, and a discontinuous blowdown of 30 ml every five minutes gave 10 cycles of concentration in the boiler water. Feedwater was produced by adjusting demineralized water to pH 10 with 0.1N NaOH. The treatment polymer was adjusted to pH of 10 and added to the feedwater. Aqueous solutions of calcium chloride, magnesium chloride, and sodium metasilicate were added to the feedwater to yield a feedwater concentration of 8 ppm total hardness (6.0 ppm Ca and 2.0 ppm Mg, as $CaCO_3$) and a silica concentration of 4.0 ppm (as $SiO_2$). Hardness concentrations were measured in the feedwater, blowdown and deaerator drop-leg. The results are summarized in Table 3.

equivalent), and one or more than one types of an amine derivatives, followed by alkaline hydrolysis.

N-hydroxyaspartamide/aspartic acid copolymer: in a procedure where one (or more) equivalent of hydroxylamine was charged (see polymers numbered 1, 2, 8, 10, 11 and 12 in Table 4): To hydroxylamine hydrochloride (1.95, 0.0285, 1.11 mole equivalent) was added deionized water (20 g) and 50% NaOH (2.24 g, 0.0285 mol) to give a clear solution of pH 7.84. This solution was added over 1–2 minutes to a suspension of poly(succinimide) (2.46 g, 0.025 mol) in deionized water (20.8 g). This suspension was magnetically stirred at room temperature for 34 hours. (The solids were found later from another experiment to disappear within 15 hours). After the pH was adjusted from 5.9 to 9.0, the solution was stirred for 2.3 hours. The pH was finally adjusted from 8.7 to 7.7 to afford a crude product which served as a precursor to products 1 and 2 in Table 4. The crude product was dialyzed against deionized water (membrane MWCO 1000) for 48 hours. To remove unreacted hydroxylamine to give pure product no. 2, the product molecular weight was determined with GPC and the composition determined with $^{13}C$ NMR, and are summarized in Table 4. Polymer nos. 8, 10, 11 and 12 were similarly synthesized. The product molecular weights and compositions are summarized in Table 4.

In a procedure where less than one equivalent of hydroxylamine was charged, (see polymer nos. 3, 5, 7, 13 and 14 in Table 4): To a mechanically stirred suspension (in a 500 ml flask) of poly(succinimide) (20.2 g, 0.204 mol ) in deionized water (50.0) under $N_2$ was added dropwise a solution of hydroxylamine prepared from hydroxylamine hydrochloride (8.50 g, 0.124 mol, 0.60 equivalent), deionized water (18.0 g), and 50% NaOH (10.3 g, 0.129 mol). The suspension was further stirred under $N_2$ at room temperature for 21 hours. A NaOH solution prepared from NaOH (9.86 g, 0.123 mol, 0.60 equivalent) and deionized water (16.1 g) was added dropwise at room temperature to the stirred suspension at pH $\leq 9.5$. The resulting brown solution was further stirred for 1

TABLE 3

Scale Boiler Test Results for Aspartic Acid and Poly(aspartic Acid)

| Antiscalant | Weight average MW vs. PSS | COOH/ hardness mole ratio | Pressure (psig) | Firerod | Hardness transport (%) Ca | Si | Mg | Blowdown iron (ppb) Fe(H) | total iron |
|---|---|---|---|---|---|---|---|---|---|
| Poly(asp) | 6.8K | 4.3/1 | 100 | clean | 81 | 80 | 13 | 38 | 89 |
| Poly(asp) | 6.8K | 2.2/1 | 100 | clean | 77 | 76 | 0 | 18 | 107 |
| Poly(asp) | 84K | 6/1 | 100 | clean | 92 | 85 | 10 | 8 | 150 |
| Aspartic Acid | — | 3/1 | 100 | clean/some sludge | 84 | 80 | 1 | — | — |
| Aspartic Acid | — | 10/1 | 100 | clean | 93 | 83 | 8 | — | — |
| Aspartic Acid | — | 10/1 | 200 | clean | 82 | 91 | 28 | — | — |
| Blank | — | — | 100 | scaled | 86 | 70 | 0 | 14 | 123 |

SYNTHETIC PROCEDURES

The copolymers in this invention may be prepared (a) by reacting polysuccinimide with one or more than one types of amine derivatives $NHR^1R^2$, followed by a,kaline hydrolysis (b) by thermal copolymerization of aspartic acid and one or more than one types of amine derivatives in the presence of or in the absence of an acid catalyst, followed by alkaline hydrolysis (c) by thermal copolymerization of maleic acid (or maleic anhydride or ammonium maleate or an equivalent), and ammonium hydroxide (or ammonia, or an hour and 20 minutes. The pH was adjusted from 8.9 to 7.3 with dilute HCl. The solution was filtered in vacuo to remove any undissolved particles to afford polymer no. 13 (N-hydroxyaspartamide/aspartic acid copolymer) (122.39 g). Part of polymer no. 13 was dialyzed to pure polymer no. 14.

Polymer nos. 3, 5 and 7 were synthesized using a procedure similar to polymer no. 14. The product molecular weights determined with GPC compositions determined with $^{13}C$ NMR spectroscopy are summarized in Table 4.

TABLE 4

Preparation Data for HA/ASP Copolymers

| Polymer | MW of poly(suc) (K)[a] | Mole % of HA[b] charged | Initial pH | Rxn temp (°C.) | Rxn time (h) | Conversion (%) | Product purity | Product Composition: N-hydroxyaspartamide/ aspartic acid | Product MW (K) |
|---|---|---|---|---|---|---|---|---|---|
| 1 | 94 | 1.12 | 7.8 | r.t. | 48 | 65 | crude | 65/35 | 2.2 |
| 2 | — | — | — | — | — | — | pure | 46/54 | 1.9 |
| 3 | 3–4 | 20 | 7.1 | r.t. | 20 | — | crude | — | 2.6 |
| 4 | — | — | — | — | — | — | pure | — | 4.5 |
| 5 | 94 | 30 | 6.8 | r.t. | 26 | 77 | crude | 23/77 | 16 |
| 6 | — | — | — | — | — | — | pure | 20/80 | 5.9 |
| 7 | 3–4 | 15 | — | r.t. | 17 | — | crude | — | 2.9 |
| 8 | 3–4 | 100 | 6.8 | r.t. | 69 | 48 | crude | 48/52 | 3.4 |
| 9 | 3–4 | 100 | 7.1 | r.t. | 68 | 46 | crude | 46/54 | 3.5 |
| 10 | 20 | 100 | 5.7 | 78 | 1 | 72 | crude | 72/28 | 3.9 |
| 11 | 95 | 100 | 8.9 | r.t 80 | 0.5 0.8 | 54 | crude | 54/46 | 6.0 |
| 12 | 95 | 100 | 7.5 | r.t | 66 | — | crude | — | 4.5 |
| 13 | 95 | 60 | — | r.t | 21 | 85 | crude | 51/49 | — |
| 14 | — | — | — | — | — | — | pure | — | 11 |

[a]The actual MWs of poly(succinimide) are not known. The MWs reported here are those of their hydrolyzed product poly(aspartic acid).
[b]The hydroxylamine was obtained by neutralizing hydroxylamine hydrochloride with one equivalent of NaOH solution.
[c]Obtained by dialyzing the up-line polymer.

The following methods were used to oxidize hydroxylamine residual and/or stabilize the N-hydroxyaspartamide/aspartic acid copolymers. For polymer no 15 in Table 5, to a stirred suspension of poly(succinimide) (5.0 g, 0.050 mol) in deionized water (25.0 g) was added a solution of hydroxylamine prepared from hydroxylamine hydrochloride (3.52 g, 0.050 mol, 1.0 equivalent), deionized water (5.5 g) and 50% NaOH (3.97 g). This gave an initial pH of 7.44. The suspension was stirred at room temperature for 14.5 hours. After the pH was adjusted from 5.8 to 7.1, the solution was stirred for 25 h. The pH was adjusted again to 9.0 and the solution was stirred for 4.5 hours. The pH was finally adjusted to 7.2. The solution was centrifuged to remove undissolved particles to give crude N-hydroxyaspartamide/aspartic acid copolymer no. 18.

For polymer no. 19, 12.5 g of polymer no. 18 was acidified with dilute HCl to pH 3.5 in order to protonate hydroxylamine residual. For polymer no. 20, 12.0 g of polymer no. 18 was acidified to pH 2.3 and then stirred with $I_2$ (1.089) for 3 hours. The pH dropped to 1.63 (some $I_2$ was still present). For polymer no. 21, 10.4 g of polymer no. 18 was dried to give 1.52 g of solids. For polymer no. 22, 12.0 g of no. 18 (pH 7.2) was stirred with $I_2$ (1.08 g). The pH dropped from 7.2 to 2.9 within one minute and to 2.27 within 10 minutes.

The molecular weights of these polymer samples were determined with GPC two days after the treatments and determined again after they were stored in a refrigerator for 1.5 months. The results are summarized in Table 5.

TABLE 5

Methods to Stabilize HA/ASP Copolymers

| Polymer | Initial MW (K) | Treatment | MW on day a (K) day n | MW | Polymer composition: N-hydroxyaspartamide/ aspartic acid | Comments |
|---|---|---|---|---|---|---|
| 15 | 3.4 | no, pH 7.5 | 105 | 2.7 | — | the polymer was degraded |
| 16 | 3.9 | no, pH 7.5 | 105 | 1.7 | — | the polymer was degraded |
| 17 | 6.0 | no, pH 6.9 | 105 | 2.6 | — | the polymer was degraded |
| 18 | 3.9 | no, pH 7.2 | 45 | 2.8 | 59/41 | the polymer was degraded |
| 19 | 4.1 | yes, pH 3.5 | 45 | 3.9 | 64/36 | $H_2NOH$ was protonated and the polymer was stabilized |
| 20 | 4.1 | yes, pH 2.3 then $I_2$ | 45 | 3.6 | 60/40 | $H_2NOH$ was oxidized and the polymer was stabilized |
| 21 | 3.9 | yet, evaporated to dryness | 45 | 3.9 | 62/38 | the polymer was stabilized at solid state |
| 22 | 4.0 | yes, pH 7.2 then $I_2$ | 45 | 3.9 | 65/35 | $H_2NOH$ was oxidized and the polymer was stabilized |
| 23 | 5.9 | yes, dialysis | 180 | 6.3 | 23/77 | the pure polymer was stable |

Any other molecules reactive toward hydroxylamine or its salt can be used to react with residual hydroxylamine or its salt. When residual hydroxylamine or its salt is consumed by such a reaction, the product polymer is stable. For example, esters, preferred water soluble esters such as glycol formate, glycol acetate; acyl chloride and amide can be used to react with residual hydroxylamine or its salt to form hydroxamic acids which are unreactive toward the polymer backbone.

The preparation of copolymers of N-phoshonomethylaspartamide/aspartic acid polymers is now described in connection with Table 6. For polymer nos. 24 and 25, to a stirred suspension of AMPA (aminomethylphosphonic acid) (81.9%, 1.39 g, 0.0102 mol, 0.82 equivalent) in deionized water (3.0) was added 10.0% NaOH solution (10.0 g, 0.025 mol, 2.5 equivalent). This solution was then added over one minute to a magnetically stirred suspension of poly(succinimide) (1.23 g, 0.0125 mol) in deionized water (9.0 g) to result in a pH of 10.8. The suspension was further stirred at room temperature for 7 hours to result in a pH of 8.2. 0.3 G of 10.0% NaOH solution was added to from a clear solution. $^{13}$C NMR analysis indicated the AMPA incorporation was about 2%. Dialysis of the crude polymer no. 24 afforded pure polymer no. 25.

was added to the solution of potassium salt of AMPA. The biphase mixture was stirred at 10° to 12° C. for 1.3 hours and at room temperature for 55 hours. 100 ml of 1:1 ethanol/diethyl ether was added to precipitate the polymer product. The solid was filtered in vacuo, washed with 1:1 ethanol/ether (100 ml) and dried at 80° C./house vacuum to afford 6.4 g of light pink solid (polymer no. 28)(yield 89.0%). The crude polymer no. 28 was dissolved in deionized water. The solution was adjusted with dilute NaOH to pH 12.0 to hydrolyze any residual poly(succinimide) and stirred at room temperature for 20 minutes. This solution was then acidified to pH 1.1 and precipitated with 1:1 ethanol/acetone. The supernatant was decanted and the precipitate was redissolved in deionized water. This procedure was repeated once to remove any DMAP and/or AMPA residual. This prepurified polymer was dialyzed to give pure polymer no. 30. The purity was confirmed with both $^{31}$P and $^{13}$NMR analyses. Polymer no. 31 was similarly synthesized. The product molecular weights and compositions are summarized in Table 6.

TABLE 6

Preparation Data N-phosphonomethylaspartamide/aspartic acid copolymers

| Polymer | MW of poly(suc) (K)[a] | Mole % of AMPA charged | Initial pH | Rxn temp (°C.) | Rxn time (h) | Rxn solvent | Conversion (%) | Product purity | Product polymer composition: N-phosphonomethyl aspartamide/ aspartic acid | Product MW (K) |
|---|---|---|---|---|---|---|---|---|---|---|
| 24 | 66 | 82 | 10.8 | r.t | 7 | water | 2 | crude | 2/98 | 71 |
| 25 | — | — | — | — | — | — | — | pure | 8/92 | 57 |
| 26 | 94 | 100 | 6.4 | 80 | 4 | water | 2 | crude | 2/98 | 43 |
| 27 | 66 | 100 | 7.5 | r.t. | 2 mon. | water | 3 | crude | 3/97 | 57 |
| 28 | 94 | 100 | 9.7 | r.t. | 0.4 | water | 4 | pure | 5/95 | |
| 29 | 66 | 100 | — | 0 to r.t. | 55 | DMF/EtOH | 15 | crude | 15/85 | 36 |
| 30 | — | — | — | — | — | — | — | pure | 17/83 | 33 |
| 31 | 94 | 100 | DMF | r.t. | 90 | DMF/EtOH | 9 | pure | 9/91 | 16 |

[a]The actual MWs of poly(succinimide) are not known. The MWs reported here are those of their hydrolyzed product poly(aspartic acid).
[b]Obtained by dialyzing the up-line polymer. Other pure products were obtained by dialyzing their corresponding crude polymers.

The product molecular weights determined with GPC and compositions determined with $^{13}$C NMR and $^{31}$P NMR spectroscopies are summarized in Table 6.

Polymers nos. 26 and 27 were similarly synthesized but only one mole equivalent of NaOH was, used. Polymer no. 28, 30% NMe$_3$ (2.4 equivalent) was used as a base to neutralize AMPA. The molecular weights and AMPA incorporations are summarized in Table 6.

For polymer nos. 29, 30 and 31, to AMPA (99%, 2.78 g, 0.025 mol) and DMAP (4-(N,N-dimethylamino)pyridine, 3.05 g, as catalyst) was added an alcoholic solution prepared from KOH(2.74 G, 0.0500 mol) and anhydrous ethanol (40 mol) over 30 minutes. To this stirred solution cooled with ice water was added dropwise under N$_2$ a solution of poly (succinimide) (2.45 g, 0.025 mol in DMF (25 ml) over 2 hours. Pink precipitate formed as poly(succinimide) solution Copolymers of N-2-sulfonoethylaspartamide/aspartic acid (SEA/ASP copolymers) were prepared as follows. In preparing copolymer nos. 32 and 33 of Table 7, to a stirred suspension of poly(succinimide) (1.25 g, 0.0125 mol) in deionized water (10.0 g) was added to a sodium taurate solution prepared from taurine (1.59 g, 0.0125 mol), deionized water (5.0 g) and 10.0% NaOH solution (5.0 g, 0.0125 mol). The resultant suspension mixture with a pH 9.9 was stirred at room temperature for 13 h to afford a clear solution. the pH of the solution was adjusted from 8.6 to 11.7 to hydrolyze any residual poly(succinimide). After the solution was stirred at room temperature for 50 minutes, it was acidified to pH 6.0 to afford crude SEA/ASP copolymer no. 32 of Table 7. Dialysis of the crude no. 32 gave pure product no. 33. The product molecular weights and compositions are summarized in Table 7.

TABLE 7

Preparation Data of N-2-sulfonoethylaspartamide/aspartic acid

| Polymer | MW of poly(suc) (K)[a] | Mole % of AES[b] charged | Initial pH | Rxn temp (°C.) | Rxn time (h) | Rxn solvent | Conversion (%) | copolymer composition: SEA/ASP[c] | Product MW (K) |
|---|---|---|---|---|---|---|---|---|---|
| 32 | 66 | 100 | 9.9 | r.t | 13 | water | 11 | 11/89 | 72 |
| 33 | — | — | — | — | — | — | — | 13/87 | 36 |

[a]The actual MWs of poly(succinimide) are not known. The MWs reported here are those of their hydrolyzed product poly(aspartic acid).
[b]AES = 2-aminoethylsulfonic acid.
[c]SEA/ASP = N-2-sulfonoethylaspartamide/aspartic acid copolymer.
[c]Obtained by dialyzing 3909-51A The synthetic procedures of hydroxyalkylaspartamide/aspartic acid copolymers nos. 37 and 38 of Table 8 are as follows. To a magnetically stirred suspension of poly(succinimide) (2.5 g, 0.025 mol) in deionized water. (20.4 g) was added a solution of ethanolamine (1.53 g, 0.025 mol 1.0 equivalent) in deionized water (20.3 g) over 17 minutes. The suspension was stirred at room temperature for 28 hours. Almost all solids disappeared within 50 minutes to form a clear solution. The pH was then adjusted from 9.4 to 8.7 to afford the crude N-2-hydroxyethylaspartamide/aspartic acid no. 37. Dialysis of no. 37 against deionized water afforded pure N-2-hydroxyaspartamide/aspartic acid copolymer no. 38. The product molecular weights determined with GPC and compositions determined with $^{13}$C NMR spectroscopy are summarized in Table 8.

N-2-hydroxyethylaspartamide/aspartic acid copolymer no. 34 was similarly prepared but only 0.50 equivalent of ethanolamine was charged. After a suspension of poly(succinimide) (5.0 g, 0.050 mol) in deionized water (35 g) was stirred with ethanolamine (1.53 g, 0.0251 mol, 0.50 equivalents) at room temperature for 20.8 hours, 0.041 moles of NaOH solution was added dropwise to form a clear solution of pH 12.98. The solution was further stirred for 1 h and then neutralized with dilute HCl to pH 6.7. Dialysis (membrane MWCO 12 to 14K) of the crude product afforded polymer no. 34 of Table 8. $^{13}$C NMR analysis indicated that most of residual ethanolamine was not removed. The product molecular weight determined with GPC and compositions determined with $^{13}$C NMR spectroscopy are summarized in Table 8.

Polymer no. 35 was prepared as follows. To a stirred powder of poly(succinimide) (15.0 g, 0.153 mol) in a 250 ml flask was added dry DMF (60 g) and ethanolamine (4.66 g, 0.0765 mol, 0.50 equivalent). The solution was stirred at room temperature for 4 hours and at 120 to 150° C. for 1 hour 35 minutes. After the solution was cooled to room temperature, 200 ml of ethanol was added. The precipitate was filtered in vacuo, dried at 70° to 80° C./vacuum to give 9.7 g of solids. The solids were ground and suspended in deionized water (60 g). A NaOH solution (4.1 g of 50% NaOH and 7.0 g of deionized water) was added over 25 minutes at pH ≦11.8. The resultant solution was further stirred for 50 minutes and then neutralized to pH 7.5 to afford almost pure product. Part of this solution was dialyzed to give pure N-2-hydroxyethylaspartamide/aspartic acid copolymer no. 35. Polymer nos. 54 and 56 were prepared similarly. The product molecular weight and compositions are summarized in Table 8.

Polymer no. 52 was prepared as follows. To a stirred solution of poly(succinimide) (1.23 g, 0.0125 mol) in dry DMF (15 g) was added 2-amino-2-methyl-1,3 propanediol (1.39 g, 0.0125 mol) in dry DMF (IOME). After the solution was stirred at room temperature for 20 hours, 150 ml of 1:2 ethanol/cyclohexane was added. The resultant precipitate was centrifuged. The supernatant was decanted and the solids were washed with ethanol. This procedure was repeated once. The solids were dried at 50° C./vacuum and then suspended in deionized water 5.0 G of 10.0% NaOH solution was added dropwise to the stirred suspension to form a clear solution. The solution was acidified to pH 2.1 and then dialyzed to afford pure polymer no. 52. The product MW determined with GPC and composition determined with $^{13}$C NMR are summarized in Table 8.

TABLE 8

Examples of alkanolaminoacidamide/aminoacid copolymers[a]

| polymer No. | MW of polysuc | M % of alkanol amine charged | reaction temp & time | reaction medium | reaction conversion | product composition | product MW |
|---|---|---|---|---|---|---|---|
| 34 | 94000 | 50% EA[a] | rt, 20 h | water | 56% | 28/72 HEA/ASP[b] | 43000 |
| 35 | 72000 | 50% EA | rt, 4 h<br>120–50° C., 1.5 h | DMF | 100 | 50/50 HEA/ASP | 16000 |
| 36 | 72000 | 50% EA | rt, 4 h<br>120–50, 1.4 h | DMF | 100 | 50/50 HEA/ASP | 16500 |
| 37 | 66000 | 100% EA | rt, 27 h | water | 30 | 30/70 HEA/ASP | 60000 |
| 38 | — | — | — | — | — | 28/72 HEA/ASP | 33000 |
| 39 | 48000 | 10% EA | rt, 3.3 h<br>120–50, 1.6 h | DMF | 100 | 10/90 HEA/ASP | 16400 |

TABLE 8-continued

Examples of alkanolaminoacidamide/aminoacid copolymers[a]

| polymer No. | MW of polysuc | M % of alkanol amine charged | reaction temp & time | reaction medium | reaction conversion | product composition | product MW |
|---|---|---|---|---|---|---|---|
| 40 | 48000 | 20% EA | rt, 4 h<br>120–65, 1.2 h | DMF | 100 | 20/80 HEA/ASP | 16500 |
| 41 | 72000 | 4% EA | rt, 4 h<br>120–65° C., 4.2 h | DMF | 100 | 4/96 HEA/ASP | 9400 |
| 42 | — | — | — | — | — | 6/94 HEA/ASP | 9600 |
| 43 | 72000 | 6% EA | 150–80° C., 5 h | DMF | 100 | 6/94 HEA/ASP | 7100 |
| 44 | 48000 | 35% EA | rt, 4 h<br>130–75° C. 1.3 h | DMF | 100 | 35/65 HEA/ASP | 9400 |
| 45 | 48000 | 30% EA | rt, 4 h<br>120–60° C., 1 h | DMF | 100 | 30/70 HEA/ASP | 10000 |
| 46 | 48000 | 25% EA | rt, 5 h<br>140–55° C., 0.9 h | DMF | 100 | 25/75 HEA/ASP | 11000 |
| 47 | 48000 | 40% EA | rt, 3.5 h<br>120–60° C., 1.3 h | DMF | 100 | 40/60 HEA/ASP | 8300 |
| 48 | 48000 | 27% EA | rt, 4.4 h<br>80–100° C., 1 h | DMF | 100 | 30/70 HEA/ASP | 29000 |
| 49 | 48000 | 30% EA | rt, 5 h<br>110–30° C., 0.5 h | DMF | 100 | 30/70 HEA/ASP | 35000 |
| 50 | 48000 | 80% EA | rt, 3 h<br>120–65° C., 1.3 h | DMF | 100 | 80/20 HEA/ASP | 13300 |
| 51 | 48000 | 30% APO[c] | rt, 22 h<br>60–80° C., 1 h | DMF | 100 | 30/70 HEA/ASP[d] | 37000 |
| 52 | 94000 | 100% AMPD[e] | rt, 20 h | DMF | 29 | 29/71 MDHA/ASP[F] | 34000 |
| 53 | 94000 | 10% Tris[g] | 50° C., 5 h | DMF | 10 | 10/90 TrisA/ASP[h] | 46000 |
| 54 | 48000 | 50% AEE[i] | rt, 12 h | water | 57 | 29/71 HEEA/ASP[j] | 46000 |
| 55 | 72000 | 7% MEA[k] | rt, 15 h<br>rt-145° C., 1.3 h,<br>145–160° C., 0.5 h | DMF | 100 | 7/93 MEA/ASP[l] | 10700 |
| 56 | 48000 | 50% AEAE[m] | rt, 12 h | water | 59 | 30/70 HEAE/ASP[n] | 45000 |

[a]EA: ethanolamine,
[b]HEA/ASP copolymer = N-(2-hydroxyethyl)aspartamide/aspartic acid copolymer:
[c]APO: 1-amino-2-propanol.
[d]HPA/ASP copolymer: N-(2-hydroxypropyl)aspartamide/aspartic acid copolymer.
[e]AMPD: 2-amino-2-methyl-1,3-propanediol.
[F]N-(2-methyl-1,3-dihydroxypropyl)aspartamide/aspartic acid copolymer.
[g]Tris/ASP: tris(hydroxymethyl)amino methane.
[h]N-(2-hydroxymethyl-1,3-dihydroxypropyl)aspartamide/aspartic acid copolymer.
[i]AEE: 2-(2-aminoethoxy)ethanol.
[j]HEEA/ASP: N-2-(2-hydroxyethoxy)ethylaspartamide/aspartic acid copolymer.
[k]MEA: 2-methoxyethylamine.
[l]MEA/ASP: N-2-methoxyethylaspartiamide/aspartic acid copolymer.
[m]AEAE: 2-(2-aminoethyl)ethanol.
[n]HEAE/ASP: N-2-(2-hydroxyethylamino)ethylaspartaminde/aspartic acid copolymer.

The synthetic procedures for low molecular weight poly(succinimide) and poly(aspartic acid) from maleic anhydride and ammonium hydroxide are as follows. For low molecular weight poly(succinimide), a slurry of maleic anhydride (196 g, 2 mol) in deionized water (400 g) was magnetically stirred and heated to 75° C. The resultant clean solution was cooled to about 20° C. and 30% ammonium hydroxide (136 g, 2 mol) was added dropwise. After addition of ammonium hydroxide was complete, the solution was further stirred at 20° C. for 45 minutes and at 83° C. for 3.5 hours. The resultant clear solution weighed 539 grams. Part of the solution was transferred to a crystallization dish (100×170 mm) and was heated to 150° C. in a vacuum oven at 0.1 mm Hg. Water was removed over a one hour time period. The resultant white solids were further heated at 150°–180° C./<0.1 mm Hg for 30 minutes and at 180° C./<0.1 mm Hg for 3.5 hours to afford brittle, orange poly(succinimide) solids (83.1 g, 84.8%) with a few grams of white solids (probably maleic anhydride) submitted and deposited on the window glass of the vacuum oven. Poly(succinimide) was soluble in DMF but insoluble in THF. IR (pellet): 1705 (s) and 1792 (VW) cm$^{-1}$ which are characteristic absorptions of cyclic imide of poly(succinimide).

Low molecular weight poly(aspartic acid) polymer nos. 57, 58 and 59 as shown in Table 9 were synthesized as follows. 10.0% NaOH solution (12.1 g, 0.0303 mol) was added dropwise to a suspension (pH=3.0) of poly (succinimide) (5.0 g, 0.051 mol) in deionized water (72 g) at 73° C. at pH value of 3.0 to 7.2 over 18 minutes to afford a red solution. The resultant solution was diluted with deionized water to 100.0 grams (3909-32). The Mw and polymer actives determined by GPC are summarized in Table 9. The product was stored in a refrigerator.

Synthesis of intermediate high molecular weight poly (succinimide) and poly(aspartic acid) from aspartic acid using ortho-phosphoric acid catalyst was carried out as follows. Poly(succinimide) was first prepared by mixing L-aspartic acid (100 g, 0.752 mol) and 85% ortho-phosphoric acid (43.3 g, 0.376 mol, 0.5 equivalent) with a spatula in a crystallization dish (170×100 mm) and evenly distributed as a paste in the bottom of the dish. An aluminum foil with small holes was placed on the top of the dish. The dish was then placed in a vacuum oven and heated at 60°–180° C./house vacuum (about 100 mm Hg) for 2.5 hours to form brittle, white foam which was removed immediately from the oven and cooled inside a hood. The crude solid poly(succinimide) was dissolved in DMF (350 ml) at 80° C. and the DMF solution was poured with stirring into deionized water (2.5 L) in a 3 liter beaker to form small pieces of white precipitate. The precipitate was collected by vacuum filtration ,and washed with deionized water 10 times (300–400 ml×10) until the filtrate reached a pH value of 3.6. The wet solids were dried at about 100° C./house vacuum for 20 hours to afford white solid poly(succinimide) (61.0 g, 83.1%).

To synthesize poly(aspartic acid) no. 60 in Table 9, a suspension of the above described poly(succinimide) (5.0 g, 0.051 mol) in deionized water (50 g) was heated to 83° C. To this was added dropwise a NaOH solution (4.1 g of 50% NaOH diluted with 30 g of deionized water 0.051 mol) over 25 minutes at a pH of 10.4. The resultant solution had a final pH value of 7.9 and weighed 72.7 grams (no. 60). The molecular weight of polymer no. 60 determined by GPC are summarized in Table 9.

In preparing polymer nos. 61 and 62 of Table 9, a poly(succinimide) polymer was first prepared as follows. A mixed paste of L-aspartic acid (75.0 g, 0564 mol) and 85% o-phosphoric acid (37.5 g, 0.325 mol ,0.58 equivalent) in a crystallization dish (170×100 mm) with an aluminum foil with holes in the top was heated in a vacuum oven to 145° C./5 mm Hg over 75 minutes and further heated at 145°–184° C./5 mm Hg for 2.0 hours. The resultant crude, rigid poly(succinimide) solids were cooled within the oven to room temperature and then scratched off the dish. The solids were dissolved in DMF (850 ml) at 80° C. The DMF solution was concentrated at 70°–90° C./40 mm Hg to about 300 ml and poured into deionized water (1.5 L). The resultant white precipitate was collected by vacuum filtration, washed with deionized water (300 ml×7) and dried at 120°–140° C./house vacuum for 14 hours, and at 70°–90° C./house vacuum for 37 hours. The dry solid poly (succinimide) weighed 54.5 g (99.5%). IR (KBr pellet): 1803 (w), 1713 (s), 1635 (sh), 1397 (s), 1360 (s), 1216 (s) and 1162 (s).

To provide polymer nos. 62 and 63, to a suspension of the above-referenced poly(succinimide) (5.0 g, 0.051 mol) in deionized water (75 g) at 70° C. was added 10.0% NaOH solution (19.8 g, 0.049 mol) at a rate of 14 to 17 ml/h to control the pH value [2] 11.9. The pH value of the resultant solution was adjusted to 8.4 and the solution was diluted to 100.0 grams. The product was kept in a refrigerator. IR (solution): 1636 (m), 1576 (s), 1395 (s), 1101 (m). The molecular weight and polymer concentration of polymer nos. 59 and 60 determined by GPC are summarized in Table 9.

Polymer no. 59 was similarly synthesized from hydrolysis of the poly(succinimide) at 50°–60° C. but excess NaOH was over added. The pH value of the solution was immediately adjusted with dilute sulfuric acid to 8–9. The molecular weight and polymer concentration of polymer no. 59 are summarized in Table 9.

High molecular weight poly(succinimide) and poly (aspartic acid) are synthesized from aspartic acid using Super PPA Catalyst as follows. According to Fieser, M., Ed. Reagents for Organic Synthesis, Vol. 5, pp. 540, John Wiley & Son, New York, a premixed paste of polyphosphoric acid (670 g) and phosphorus pentoxide (130.8 g) in a 1000 ml-jar equipped with a mechanical stirrer was heated with a strong nitrogen stream to 140° C. over 30 minutes to form a fluid sufficiently soft to be mechanically stirred. The fluid was then heated with stirring to 175° C. over 1 hour and further heated at 175°–190° C. for 2.0 hours to afford 761.8 g of a tacky fluid.

A mixture of L-aspartic acid (75.0 g, 0.564 mol) and super PPA (48.0 g, about 1 equivalent) were added into a crystallization dish (170×100 mm). The dish with a holed aluminum foil on the top was placed into a vacuum oven and heated to 300° F. (150° C., outer temperature, not reactant temperature) at 0.1 mm Hg to form a soft semi-fluid. The oven was opened and the reactants were quickly mixed with a spatula. The paste was then heated in the same oven at 300°–440° F. (150°–227° C.)/<0.1 mm Hg for 4.5 hours. The crude product was cooled to room temperature inside the oven and divided into two parts (A and B). Part A (21.0 g) of the crude product was dissolved in DMF (200 ml) at 60° C. The DMF solution was concentrated at 60° C./<1 mm Hg to 120 ml and then poured into deionized water (300 ml). The resultant precipitate was collected by vacuum filtration, washed with deionized water (200 ml×6) and dried at 160° C./<0.1 mm Hg for 1 hour and at 120° C./house vacuum for 48 hours to afford 11.1 g of pure, white solid poly (succinimide).

Part B (72.8 g) of the above crude product was ground (twice using 5 and 0.5 mm grinders, respectively). 67.0 g of the ground crude poly(succinimide) was heated in a vacuum oven (pre-heated to 180° C.) at 180° C./0.1 mm Hg for 3.5 hours to give 62.8 g of crude poly(succinimide) D. 33.0 g of crude poly(succinimide) D was dissolved in DMF (300 ml) at 60°–70° C. The DMF solution was poured to deionized water (1000 ml). The precipitate was collected by filtration, washed with deionized water (400 ml×7) and dried at 150°–160° C./<0.1 mm Hg for 1 hour and at 120° C./wall vacuum for 62 hours to give pure, dirty white solid poly (succinimide)(18.3 g). The rest of crude poly(succinimide) D (29.8 g) was ground to $^2$0.5 mm and heated at 180–200/$^2$0.1 mm Hg for 4.5 hours and purified using the procedure as mentioned earlier to give 14.7 g of light grey, pure poly(succinimide).

Poly(aspartic acid) polymer nos. 64, 65, 68, 69 and 70 of Table 9 were prepared as follows. Under conditions similar to those for the hydrolysis of poly(succinimide) to poly (aspartic acid) no. 63, samples of poly(succinimide) were hydrolyzed to poly(aspartic acid) nos. 64, 67 and 68, respectively. IR (solution) of poly(aspartic acid) no 65: 1638 (m), 1575 (s), 1396 (s). The molecular weights and polymer concentrations determined by GPC are summarized in Table 9.

Poly(aspartic acid) no. 70 of Table 9 was synthesized from hydrolysis of the same batch, of poly(succcinimide) as for poly(aspartic acid) no. 65. High molecular weight poly (succinimide) and therefore high molecular weight poly (aspartic acid) no. 65 were reproduced from L-aspartic acid and super PPA by exactly following the procedure above. Poly(aspartic acid) no. 66 was such a product.

Water soluble, lightly cross-linked poly(aspartic acid) nos. 71 and 72 were synthesized as follows. To a solution of poly(succinimide) (1.23 g, 0.0125 mol) in dry DMF (20 ml, dried with activated 4 Å MS) was added 3.0 g of a solution of 0.040% 1,6-hexanediamine (0.10 wt %) in dry DMF. The mixture was stirred in a closed glass jar at room temperature for 7.5 hours. 150 mL of at mixed solvent (ethanol:cyclohexane=1:2) was added to the DMF solution. The resultant precipitate was filtered, washed with the mixed solvent and dried at 60° C./<0.1 mm Hg for 4 hours to afford 1.24 grams (100%) of a water insoluble, lightly cross-linked poly(succinimide) solid. The solid was suspended in deionized water (77 g) and hydrolyzed at room temperature with 10.0% NaOH solution (4.90 g) over 75 min. The final solution pH value was adjusted with dilute hydrochloric acid from 13.10 to 6.83. The molecular weight and polymer concentration of water soluble, lightly cross-linked poly (aspartic acid) no. 68 are summarized in Table 9.

Water soluble, lightly cross-linked poly(aspartic acid) no. 69 was similarly synthesized with replacement of 1,6-hexanediamine for tris(2-aminoethyl)amine.

TABLE 9

Molecular Weights of Different Poly(aspartic acid) Samples

| Poly(asp) sample number | MW (K) |
|---|---|
| 57 | 2.8 |
| 58 | 3.25 |
| 59 | 3.25 |
| 60 | 20.2 |
| 61 | 66 |
| 62 | 66 |
| 63 | 71 |
| 64 | 80 |
| 65 | 84 |
| 66 | 90 |
| 67 | 92 |
| 68 | 94 |
| 69 | 95 |
| 70 | 96 |
| 71 | 104 |
| 72 | 114 |

The poly(aspartic acid), aspartic acid monomer and functionalized poly(aspartic acid) polymers of the present invention may be used alone or in combination with other scale inhibitors and dispersants such as phosphates, pyrophosphsales, nitrilotriacetic acid, ethylenediamine tetraacetic acid, and/or other synthetic organic polymers (e.g. acrylate type of polymers). Such compositions may exert a synergistic effect in terms of scale inhibition, dispersancy and hardness transport.

Further, aspartic acid, poly(aspartic acid) and functionalized poly(aspartic acid) may be used alone or in combination with any corrosion inhibitors such as sodium sulfite, E-erythorbic acid, escorbic acid, diethylhydroxylamine, hydroquinone, methyl, ethyl ketoxime, organic amines and other chemical additives. Such compositions may exert a synergistic effect in terms of corrosion inhibition.

The present invention is useful in reducing scale formation in industrial aqueous systems of steam generators, scale boilers and the like. The polymers invented can. be used alone or in combination with other biodegradable chemicals and non-biodegradable chemicals, including small molecules or polymers which are scale inhibitors and/or corrosion inhibitors.

It should be understood that,various changes and modifications to the presently preferred embodiments described herein will be apparent to those skilled in the art. Such changes and modifications can be made without departing from the spirit and scope of the present invention and without diminishing its attendant advantages and is therefore intended that such changes and modifications be covered by the appended claims.

What is claimed:

1. A steam generator scale inhibiting composition comprising:

a polymer comprising aspartic acid mer units and functionalized aspartic acid mer units wherein the aspartic acid mer unit has the following formula:

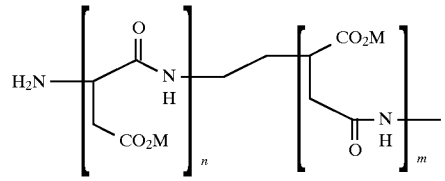

where M is selected from the group consisting of H, an alkaline metal, an alkaline earth metal and ammonium; $n/(n+m) \times 100\%$ ranges from 0% to 100%, $m/(n+m) \times 100\%$ ranges from 0% to 100%; and wherein the functionalized aspartic acid mer unit has the following formula:

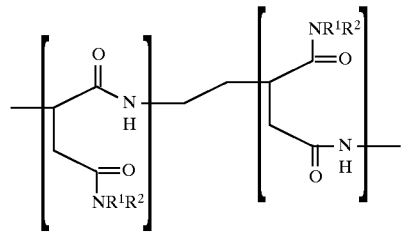

wherein $R^1$ is selected from the group consisting of $CH_3$ and $CH_2CH_3$; $R^2$ is selected from the group consisting of OH, $C_1$ to $C_{30}$ aryl, one or more hydroxy substituted aryl groups, one or more OR substituted aryl groups wherein R is a $C_1$ to $C_4$ alkyl, one or more $SO_3M^1$ substituted alkyl groups, one or more $SO_3M^1$ substituted aryl groups wherein $M^1$ is H, an alkaline metal ion, an alkaline earth metal ion, ammonium, $Al^{+3}$, $Fe^{+2}$ or $Fe^{+3}$, one or more $PO_3M_2^2$ substituted alkyl groups, and one or more $PO_3M_2^2$ substituted aryl groups wherein $M^2$ is selected from the group consisting of H, an alkaline metal ion, an alkaline earth metal ion, ammonium, $Al^{+3}$, $Fe^{+2}$ and $Fe^{+3}$.

2. The composition of claim 1, wherein a ratio of the functionalized aspartic acid monomer units to aspartic acid monomer units ranges from about 0.01:99.99 to about 99.99:0.01.

3. The composition of claim 1, wherein the polymer has a molecular weight ranging from about 500 to about 200,000.

4. A steam generator scale inhibiting composition comprising:

a polymer comprising aspartic acid mer units and functionalized aspartic acid mer units, wherein the polymer has the following formula:

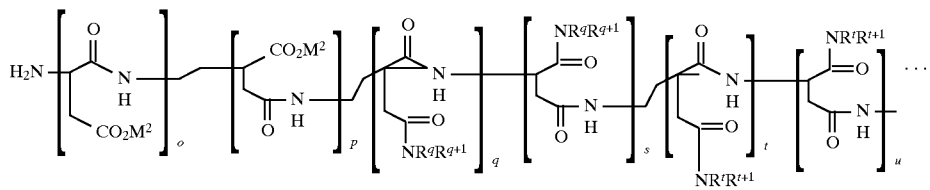

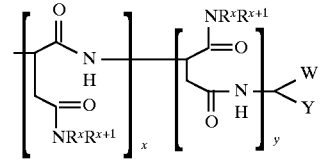

where o, p, q, s, t, u, ..., x and y are zero or positive integers and o/(o+p)×100% ranges from 0% to 100%, p/(o+p) x 100% ranges from 0% to 100%, o/(o+p)×100%+p/(o+p)×100% is 100%; q/(q+s)×100% ranges from 0% to 100%, s/(q+s)×100% ranges from 0% to 100%, q/(q+s)×100%+s/(q+s)×100% is 100%; t/(t+u)×100% ranges from 0% to 100%, u/(t+u)×100% ranges from 0% to 100%, t/(t+u)×100%+u/(t+u)×100% is 100%; x/(x+y)×100% ranges from 0% to 100%, y/(x+y)×100% ranges from 0% to 100%, x/(x+y)×100%+y/(x+y)×100% is 100%; (o+p)/(o+p+q+s+t+u+ ... +x+y)×100% ranges from 20% to 80%; (q+s+t+u+ ... +x+y)/(o+p+q+s+t+u+ ... +x+y)×100% ranges from 20% to 80%; (o+p)/(o+p+q+s+t+u+ ... +x+y)×100%+(q+s+t+u+ ... +x+y)/(o+p+q+s+t+u+ ... +x+y)×100% is 100%; (q+s)/(q+s+t+u+ ... +x+y)×100% ranges from greater than 0% to 100%; (t+u)/(q+s+t+u+ ... +x+y)×100% ranges from greater than 0% to 100%; (x+y)/(q+s+t+u+ ... +x+y)×100% ranges from greater than 0% to 100%; (q+s)/(q+s+t+u+ ... +x+y)+(t+u)/(q+s+t+u+ ... +x+y)+(x+y)/(q+s+t+u+ ... +x+y)×100% is 100%; $M^2$ is selected from the group consisting of H, an alkaline metal, an alkaline earth metal, ammonium, aluminum, and iron; $R^q$ through $R^x$ are selected from the group consisting of $CH_3$ and $CH_2CH_3$; $Rq^{+1}$ through $R^{x+1}$ are selected from the group consisting of OH, $C_1$ to $C_{10}$ aryl, one or more hydroxy groups substituted aryl, one or more OR'substituted aryl groups where R is a $C_1$ to $C_4$ alkyl, one or more $SO_3M^3$ substituted alkyl groups, one or more $SO_3M^3$ substituted aryl groups wherein $M^3$ is H, an alkaline metal, an alkaline earth metal, ammonium, aluminum or iron, one or more $PO_3M_2^4$ substituted alkyl, and one or more $PO_3M_2^4$ substituted aryl where $M^4$ is H, an alkaline metal, an alkaline earth metal, ammonium, aluminum or iron; W is $CO_2M^5$, $CONR^1R^2$, Y is $CH_2CO_2M^5$ or $CH_2CONR^1R^2$ wherein $M^5$ is H, an alkaline metal, an alkaline earth metal, ammonium, $Al^{+3}$, $Fe^{+2}$ or $Fe^{+3}$, $R^1$ is H, $CH_3$ or $CH_2CH_3$, and $R^2$ is selected from the same group defined above for said $R^{q+1}$ through $R^{x+1}$.

5. A method of preventing the formation of scales on steam generator surfaces immersed in a feedwater, the method comprising the following step:
adding a polymer to the feedwater, the polymer comprising aspartic acid mer units and functionalized aspartic acid mer units, wherein the aspartic acid mer unit has the following formula:

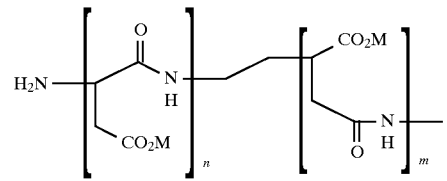

where M is selected from the group consisting of H, an alkaline metal, an alkaline earth metal and ammonium; n/(n+m)×100% ranges from 0% to 100%, m/(n+m)×100% ranges from 0% to 100%; and wherein the functionalized aspartic acid mer unit has the following formula:

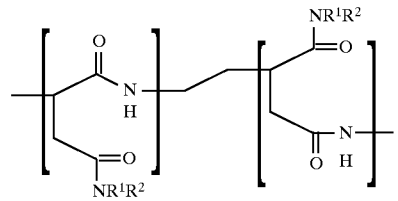

wherein $R^1$ is selected from the group consisting of $CH_3$ and $CH_2CH_3$; $R^2$ is selected from the group consisting of OH, $C_1$ to $C_{30}$ aryl, one or more hydroxy substituted aryl groups, one or more OR substituted aryl groups wherein R is a $C_1$ to $C_4$ alkyl, one or more $SO_3M^1$ substituted alkyl groups, one or more $SO_3M^1$ substituted aryl groups wherein $M^1$ is H, an alkaline metal ion, an alkaline earth metal ion, ammonium, $Al^{+3}$, $Fe^{+2}$ or $Fe^{+3}$, one or more $PO_3M_2^2$ substituted alkyl groups, and one or more $PO_3M_2^2$ substituted aryl groups wherein $M^2$ is selected from the group consisting of H, an alkaline metal ion, an alkaline earth metal ion, ammonium, $Al^{+3}$, $Fe^{+2}$ and $Fe^{+3}$.

6. The method of claim 5, wherein a ratio of the functionalized aspartic acid monomer units to aspartic acid monomer units ranges from 0.01:99.99 to about 99.99:0.01.

7. The method of claim 5, wherein the polymer has a molecular weight ranging from about 500 to about 200,000.

8. The method of claim 5, further comprising the step of adding one or more scale inhibitors and dispersants selected from the group consisting of phosphates, pyrophosphates, nitrilotriacetic acid, ethylenediaminetetracetic acid, and organic polymers.

9. The method of claim 5, further comprising the following step adding a corrosion inhibitor selected from the group consisting of sodium sulfite, E-erythorbic acid, ascorbic acid, diethylhydroxylamine, hydroquinone and organic amines.

10. A method of preventing the formation of scales on steam generator surfaces immersed in a feedwater, the method comprising the following step:

adding a polymer to the feedwater, the polymer comprising aspartic acid mer units and functionalized aspartic acid mer units, wherein the polymer has the following formula:

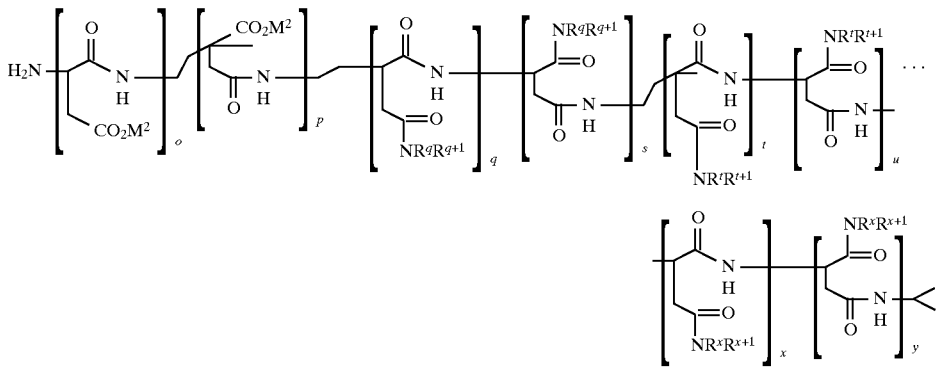

where o, p, q, s, t, u, ... x and y are zero or positive integers and $o/(o+p) \times 100\%$ ranges from 0% to 100%, $p/(o+p) \times 100\%$ ranges from 0% to 100%, $o/(o+p) \times 100\% + p/(o+p) \times 100\%$ is 100%; $q/(q+s) \times 100\%$ ranges from 0% to 100%, $s/(q+s) \times 100\%$ ranges from 0% to 100%, $q/(q+s) \times 100\% + s/(q+s) \times 100\%$ is 100%; $t/(t+u) \times 100\%$ ranges from 0% to 100%, $u/(t+u) \times 100\%$ ranges from 0% to 100%, $t/(t+u) \times 100\% + u/(t+u) \times 100\%$ is 100%; $x/(x+y) \times 100\%$ ranges from 0% to 100%, $y/(x+y) \times 100\%$ ranges from 0% to 100%, $x/(x+y) \times 100\% + y/(x+y) \times 100\%$ is 100%; $(o+p)/(o+p+q+s+t+u+ \ldots +x+y) \times 100\%$ ranges from 20% to 80%; $(q+s+t+u+ \ldots +x+y)/(o+p+q+s+t+u+ \ldots +x+y) \times 100\%$ ranges from 20% to 80%; $(o+p)/(o+p+q+s+t+u+ \ldots +x+y) \times 100\% + (q+s+t+u+ \ldots +x+y)/(o+p+q+s+t+u+ \ldots +x+y) \times 100\%$ is 100%; $(q+s)/(q+s+t+u+ \ldots +x+y) \times 100\%$ ranges from greater than 0% to 100%; $(t+u)/(q+s+t+u+ \ldots +x+y) \times 100\%$ ranges from greater than 0% to 100%; $(x+y)/(q+s+t+u+ \ldots +x+y) \times 100\%$ ranges from greater than 0% to 100%; $(q+s)/(q+s+t+u+ \ldots +x+y)+(t+u)/(q+s+t+u+ \ldots +x+y)+(x+y)/(q+s+t+u+ \ldots +x+y) \times 100\%$ is 100%; $M^2$ is selected from the group consisting of H, an alkaline metal, an alkaline earth metal, ammonium, aluminum and iron; $R^q$ through $R^x$ are selected from the group consisting of H, $CH_3$ and $CH_2CH_3$; $R^{q+1}$ through $R^{x+1}$ are selected from the group consisting of OH, $C_1$ to $C_{10}$ aryl, one or more hydroxy groups substituted aryl, one or more OR substituted aryl groups where R is a $C_1$ to $C_4$ alkyl, one or more $SO_3M^3$ substituted alkyl groups, one or more $SO_3M^3$ substituted aryl groups wherein $M^3$ is H, an alkaline metal, an alkaline earth metal, ammonium, aluminum or iron, one or more $PO_3M_2^4$ substituted alkyl, and one or more $PO_3M_2^4$ substituted aryl where $M^4$ is H, an alkaline metal, an alkaline earth metal, ammonium, aluminum or iron; W is $CO_2M^5$ or $CONR^1R^2$, Y is $CH_2CO_2M^5$ or $CH_2CONR^1R^2$ wherein $M^5$ is H, an alkaline metal, an alkaline earth metal, ammonium, $Al^{+3}$, $Fe^{+2}$ or $Fe^{+3}$, $R^1$ is H, $CH_3$ or $CH_2CH_3$, and $R^2$ is selected from the same group defined above for $R^{q+1}$ through $R^{x+1}$.

11. An aqueous solution for use in steam generator heat transfer equipment comprising:

an industrial feedwater; and a polymer comprising aspartic acid mer units and functionalized aspartic acid mer units wherein the aspartic acid unit has the following formula:

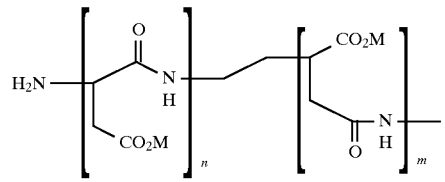

where M is selected from the group consisting of H, an alkaline metal, an alkaline earth metal and ammonium; $n/(n+m) \times 100\%$ ranges from 0% to 100%, $m/(n+m) \times 100\%$ ranges from 0% to 100%; and wherein the functionalized aspartic acid mer unit has the following formula:

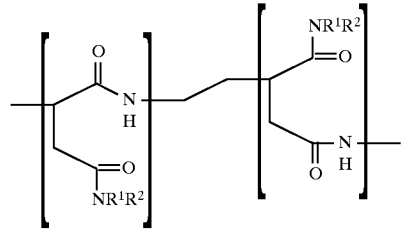

wherein $R^1$ is selected from the group consisting of $CH_3$ and $CH_2CH_3$; $R^2$ is selected from the group consisting of OH, $C_1$ to $C_{30}$ aryl, one or more hydroxy substituted aryl groups, one or more OR substituted aryl groups wherein R is a $C_1$ to $C_4$ alkyl, one or more $SO_3M^1$ substituted alkyl groups, one or more $SO_3M^1$ substituted aryl groups wherein $M^1$ is H, an alkaline metal ion, an alkaline earth metal ion, ammonium, $Al^{+3}$, $Fe^{+2}$ or $Fe^{+3}$, one or more $PO_3M_2^2$ substituted alkyl groups, and one or more $PO_3M_2^2$ substituted aryl groups wherein $M^2$ is selected from the group consisting of H, an alkaline metal ion, an alkaline earth metal ion, ammonium, $Al^{+3}$, $Fe^{+2}$ and $Fe^{+3}$.

12. The solution of claim 11, wherein a ratio of the functionalized aspartic acid monomer units to aspartic acid monomer units ranges from 0.01:99.99 to about 99.99:0.01.

13. The solution of claim 11, wherein the polymer has a molecular weight ranging from about 500 to about 200,000.

14. The solution of claim 11, further comprising
one or more scale inhibitors and dispersants selected from the group consisting of phosphates, pyrophosphates, nitrilotriacetic acid, ethylenediaminetetracetic acid, and organic polymers.

15. The solution of claim 11, further comprising
a corrosion inhibitor selected from the group consisting of sodium sulfite, E-erythorbic acid, ascorbic acid, diethylhydroxylamine, hydroquinone and organic amines.

16. An aqueous solution for use in steam generator heat transfer equipment comprising:
an industrial feedwater; and
a polymer comprising aspartic acid mer units and functionalized aspartic acid mer units, wherein the polymer has the following formula:

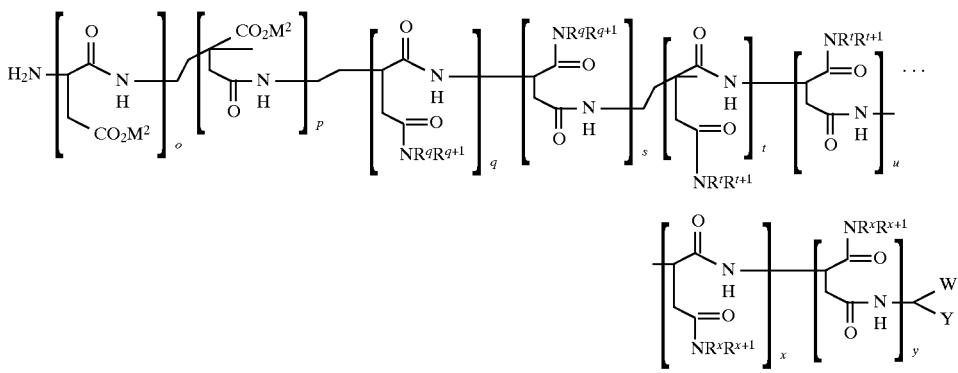

where o, p, q, s, t, u, . . . , x and y are zero or positive integers and o/(o+p)×100% ranges from 0% to 100%, p/(o+p)×100% ranges from 0% to 100%, o/(o+p)×100%+p/(o+p)×100% is 100%; q/(q+s)× 100% ranges from 0% to 100%, s/(q+s)×100% ranges from 0% to 100%, q/(q+s)×100%+s/(q+s)× 100% is 100%; t/(t+u)×100% ranges from 0% to 100%, u/(t+u)×100% ranges from 0% to 100%, t/(t+u)×100%+u/(t+u)×100% is 100%; x/(x+y)× 100% ranges from 0% to 100%, y/(x+y)×100% ranges from 0% to 100%, x/(x+y)×100%+y/(x+y)× 100% is 100%; (o+p)/(o+p+q+s+t+u++x+y)×100% ranges from 20% to 80%; (q+s+t+u++x+y)/(o+p+q+ s+t+u+ . . . +x+y)×100% ranges from 20% to 80%; (o+p)/(o+p+q+s+t+u+ . . . +x+y)×100%+(q+s+t+ u+ . . . +x+y)/(o+p+q+s+t+u+ . . . +x+y)×100% is 100%; (q+s)/(q+s+t+u+ . . . +x+y)×100% ranges from greater than 0% to 100%; (t+u)/(q+s+t+u+ . . . +x+y)×≠ 100% ranges from greater than 0% to 100%; (x+y)/(q+s+t+u+ . . . +x+y)×100% ranges from greater than 0% to 100%; (q+s)/(q+s+t+u+ . . . +x+y)+(t+u)/(q+s+t+u+ . . . +x+y)+(x+y)/(q+s+t+ u+ . . . +x+y)×100% is 100%; $M^2$ is selected from the group consisting of H, an alkaline metal, an alkaline earth metal, ammonium, aluminum and iron; $R^q$ through $R^x$ are selected from the group consisting of $CH_3$ and $CH_2CH_3$; $R^{q+1}$ through $R^{x+1}$ are selected from the group consisting of OH, $C_1$ to $C_{10}$ aryl, one or more hydroxy groups substituted aryl, one or more OR substituted aryl groups where R is a $C_1$ to $C_4$ alkyl, one or more $SO_3M^3$ substituted alkyl groups, one or more $SO_3M^3$ substituted aryl groups wherein $M^3$ is H, an alkaline metal, an alkaline earth metal, ammonium, aluminum or iron, one or more $PO_3M_2^4$ substituted alkyl, and one or more $PO_3M_2^4$ substituted aryl where $M^4$ is H, an alkaline metal, an alkaline earth metal, ammonium, aluminum or iron; W is $CO_2M^5$ or $CONR^1R^2$, Y is $CH_2CO_2M5$ or $CH_2CONR^1R^2$ wherein $M^5$ is H, an alkaline metal, an alkaline earth metal, ammonium, aluminum or iron, $R^1$ is H, $CH_3$ or $CH_2CH_3$, and $R^2$ is selected from the group consisting of $R^{q+1}$ through $R^{x+1}$ wherein $R^{q+1}$, $R^{t+1}$, . . . , $R^{x+1}$.

* * * * *